G. CONSTANTINESCO.
MEANS FOR ACTUATING SPEED INDICATING DEVICES, GOVERNORS, AND OTHER DEVICES FROM ROTATING SHAFTS.
APPLICATION FILED SEPT. 16, 1919.

1,386,925.

Patented Aug. 9, 1921.
2 SHEETS—SHEET 1.

INVENTOR
G. Constantinesco,
BY H. R. Kerslake
ATTORNEY

G. CONSTANTINESCO.
MEANS FOR ACTUATING SPEED INDICATING DEVICES, GOVERNORS, AND OTHER DEVICES FROM ROTATING SHAFTS.
APPLICATION FILED SEPT. 16, 1919.
1,386,925.
Patented Aug. 9, 1921.
2 SHEETS—SHEET 2.
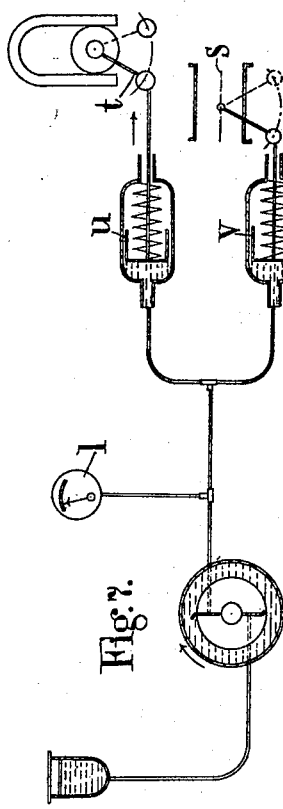
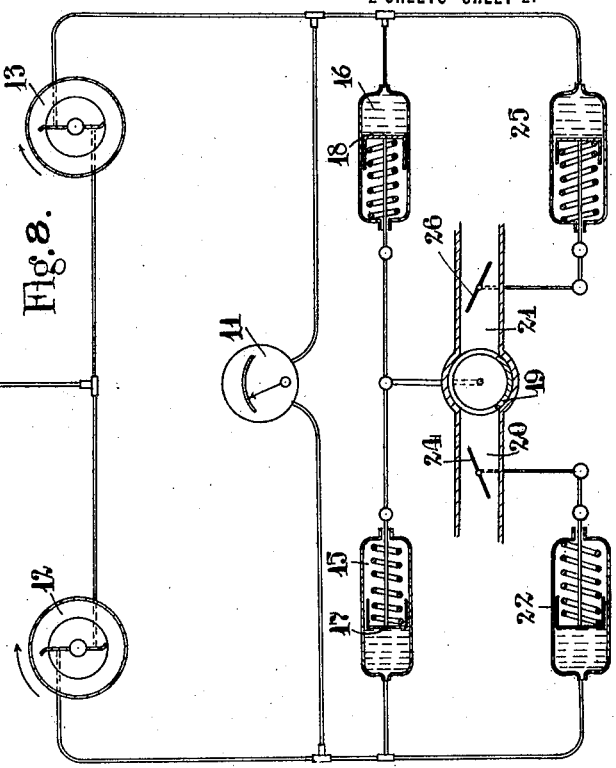
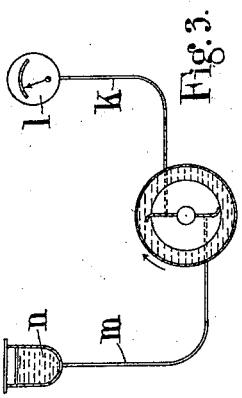
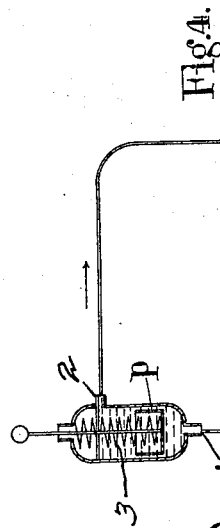
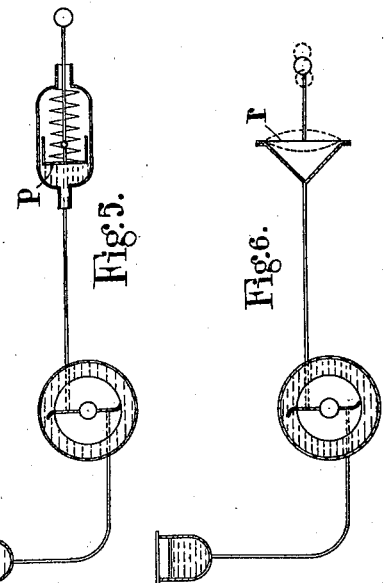
G. Constantinesco, INVENTOR
BY H. R. Kerslake
ATTORNEY

UNITED STATES PATENT OFFICE.

GEORGE CONSTANTINESCO, OF WEYBRIDGE, ENGLAND.

MEANS FOR ACTUATING SPEED-INDICATING DEVICES, GOVERNORS, AND OTHER DEVICES FROM ROTATING SHAFTS.

1,386,925.     Specification of Letters Patent.     Patented Aug. 9, 1921.

Application filed September 16, 1919. Serial No. 324,123.

*To all whom it may concern:*

Be it known that I, GEORGE CONSTANTINESCO, a subject of the King of Great Britain and Ireland, and residing at "Carmen Sylva," Beechwood avenue, Oatlands Park, Weybridge, in the county of Surrey, England, have invented certain new and useful Improved Means for Actuating Speed-Indicating Devices, Governors, and other Devices from Rotating Shafts, of which the following is a specification.

The present invention relates to devices of the type which are described in my British patent specification No. 1761 of 1918 as applied to speed indicating devices.

In the said patent specification the speed of rotation of a shaft is measured by the use of a Pitot tube immersed in a ring of liquid kept in position by centrifugal force in a vessel rotating with the shaft.

The present invention consists in means by which the depth of the liquid ring can be maintained constant independently of the quantity of liquid in the system.

The invention further consists in providing a secondary Pitot tube the pressure branch of which is immersed in the liquid and arranged at a point nearer to the axis of the rotating shaft than the inlet of the principal Pitot tube which transmits the pressure of the liquid.

The invention further consists in connecting the secondary Pitot tube to a small reservoir of liquid situated at a higher level than the rotor.

The invention also consists in the application of the instrument having principal and secondary Pitot tubes for obtaining the supply of liquid under pressure dependent on the speed of rotation of the shaft, and in utilizing this liquid for governors, pumps, or other purposes.

The invention also consists in the improved means for obtaining a supply of liquid under pressure dependent on the speed of rotation of the shaft, hereinafter described.

Referring to the accompanying drawings:—

Fig. 3 is a diagrammatic view showing the operation of the apparatus.

Fig. 4 is a diagrammatic view of a modified application.

Figs. 5 and 6 are diagrammatic views of the device applied to the actuation of a device such as a valve.

Fig. 7 shows the apparatus applied as a means for controlling the throttle and the spark advance of an internal combustion engine.

Fig. 8 shows the apparatus employed for indicating the speed of two shafts and for governing the speed so that the shafts are kept rotating synchronously.

Figure 1:
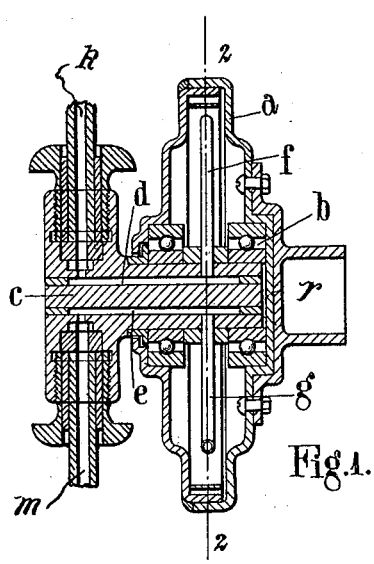
Figure 1 is an axial section.
Figure 2:
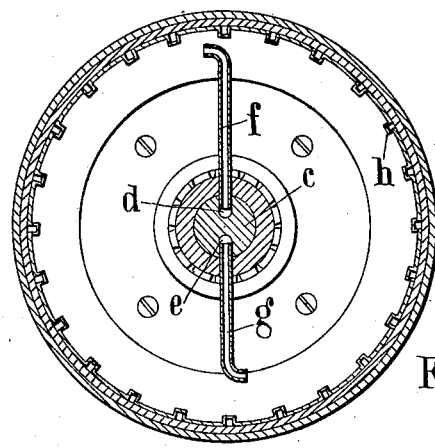
Fig. 2 is a section on the line 2—2, Fig. 1, of a device constructed according to the invention.

In the form of invention shown in Figs. 1, 2, and 3, the rotor $a$, formed of two cup-shaped pieces in which the liquid is contained, rotates on bearings $b$, being connected to a driven shaft by means of the lug $r$. The bearings are mounted on a fixed shaft $c$ having passages $d$, $e$, formed therein leading to the two Pitot tubes $f$ $g$. The tube $f$ is longer than the tube $g$ as indicated in Fig. 2. The passage $d$ is connected by a pipe $k$ with a gage and the passage $e$ by a pipe $m$ to a reservoir $n$. Ribs $h$ may be provided in the circumference of the chamber containing liquid to decrease the relative slip between the liquid and the rotor. The longer Pitot tube $f$ is connected by a tube $k$ with a pressure gage $l$, while the shorter Pitot tube $g$ is connected by a pipe $m$ with a liquid reservoir $n$.

When the apparatus is at rest the liquid will remain in the lower part of the rotor $a$ filling this rotor up to the level of the bearings and any excess will flow out through the bearings. On rotating the rotor the liquid will be carried around also and will take the form of a ring around the circumference of the rotor, and this ring will diminish in depth, the excess liquid being gradually forced through the pipe $m$ into the reservoir $n$. Liquid will be continually forced into the reservoir $n$ until the shorter end of the Pitot tube is just immersed in the liquid so that when the rotor is rotating above a predetermined speed, the liquid it contains will be in the form of a ring of constant depth. The pressure transmitted from the longer leg of the Pitot tube to the pressure gage $l$ through the pipe $k$ will accordingly be registered, and the indication of the instrument will depend only on the velocity of the liquid.

The capacity of the rotor of the instrument should be such that when the instrument is at rest, the small reservoir should just be empty of liquid, the rotor being nearly half full. Any excess of liquid which may be put in the small reservoir when the rotor is at rest, would simply pour out of the bearings of the rotor. The capacity of the rotor should be on the other hand of such size that when the rotor is rotated and all the liquid is thrown into the form of a ring by the centrifugal force, the depth of the ring thus formed is sufficient to cover the inlet of both the principal and secondary Pitot tube.

It can be seen that in this way the quantity of liquid in the rotor $a$ is constant during the whole time it is rotating. At the same time there will be a reserve of liquid in the small reservoir $n$ which will compensate automatically any losses due to evaporation or otherwise in the instrument. It is obvious that if the depth of the liquid ring is not sufficient to cover the inlet of the secondary Pitot tube $g$, the pressure at its inlet falls and liquid from the small reservoir $n$ flows by gravity into the rotor $a$ until the ring of liquid has reached a depth sufficient to cover the secondary Pitot tube inlet. A pressure is then created against the gravity of the liquid in the small reservoir and the flow due to gravity is stopped.

When the rotor is brought to rest, gravity asserts itself again on the liquid from the reservoir and the liquid flows back into the instrument, the reservoir remaining empty.

By this arrangement as long as there is any liquid left in the small reservoir when the rotor revolves the depth of the liquid ring in the rotor remains constant.

The invariability of the depth of the liquid ring in the rotor is important when the instrument is used in conjunction with an ordinary pressure gage, from the principal Pitot tube only the pressure branch being used. When the main Pitot tube is used with both its branches connected to a differential gage, a variable depth of the liquid ring in the rotor does not cause a great variation of pressure on a differential gage because the effect of the static centrifugal pressure in the rotor depends on the depth of the liquid ring and is the same on both branches of the principal Pitot tube and therefore disappears in the differential gage. But if only the pressure branch of the principal Pitot tube is used and is connected to the pressure gage, as shown in the figures, the depth of the liquid ring has an important bearing on the readings on the pressure gage because the pressure measured would be of two parts; the first part is the dynamic pressure due to the relative speed between the liquid and the Pitot tube at the inlet of the tube and is independent of the thickness of the liquid ring; the second part is the static pressure all over the liquid ring due to the centrifugal action and depends on the depth of the liquid ring.

The present invention has a very important application owing to the fact that any loss or excess of liquid in the rotor is automatically compensated from a small reservoir, enables one to use the pressure of liquid created on the principal Pitot tube to actuate other apparatus than a pressure gage.

In the forms of the invention shown in Figs. 4, 5 and 6, the pressure produced in the liquid is caused to actuate a piston $p$ or diaphragm $r$ to work any suitable piece of apparatus such as a governor for controlling the prime mover which drives the rotor.

In the form of the invention shown in Fig. 4 one branch of the Pitot tube is connected to the bottom of the cylinder at the point 1 and the other branch is connected to the other end of the cylinder at the point 2. A piston $p$ moves in the cylinder, being kept in a mean position by a spring 3. Since the difference in pressure on the two sides of the piston $p$ produced by the liquid pressure in the Pitot tubes acts in opposite directions of the piston $p$, this will move up or down according to the speed of rotation of the rotor.

I may use this invention therefore, to govern the speed of steam turbines, hydraulic turbines, or any form of steam, hydraulic or internal combustion engine by simply using the pressure and flow of liquid from the main Pitot tube to actuate a piston or device governing the valves, vanes, throttles, or any other part of a machine.

In the form of the invention shown in Fig. 7, the pressure produced in the rotor is employed to automatically actuate the spark advance in a magneto used on an internal combustion engine and at the same time to control the throttle in order to prevent the engine exceeding a certain speed. The pipe leading from the longer branch of the Pitot tube in this case actuates two pistons $u\ v$ one of which is connected to the spark advance lever $t$ while the other is connected to the throttle valve $s$. A speed indicator $l$ may also be connected as in Figs. 1, 2 and 3.

Fig. 8 shows the apparatus actuating a differential gage 11 indicating the difference between the speed of rotation of two shafts connected to separate rotors 12, 13. The shorter tubes inside the two rotors are connected to a common reservoir 14. The longer ends of the Pitot tubes in addition to being connected to the differential gage 11 are connected to cylinders 15, 16 in which two connected pistons 17, 18 can reciprocate. These pistons form differential governors controlling the valve 19 by which the flow of air through two pipes 20, 21, leading to different carbureters is controlled. The longer Pitot tube from one instrument is also connected to a governing piston 22 controlling a throttle valve 24, while the longer tube of the other instrument is connected to the piston 25 controlling the throttle valve 26. The two instruments in this case, therefore, control a common differential governor and also maximum speed governors, one for each engine cylinder, and a differential gage indicating the relative speeds of the two shafts.

The above was given only as an example, but many other combinations are possible where it is necessary to synchronize a large number of machines.

Having now described my invention what I claim as new and desire to secure by Letters Patent is:—

1. In apparatus of the type indicated, comprising a rotor, liquid in said rotor, and a tube within said rotor having its end continuously immersed in the liquid above a certain speed of said rotor, a second tube shorter than the first having its end lipping the liquid at said certain speed of the rotor, a device to be actuated by liquid pressure, a reservoir of liquid, a connection between said first tube and said device to be actuated, and a connection between said second tube and said reservoir of liquid, as set forth.

2. In apparatus of the type indicated, comprising a rotor, liquid in said rotor, and a tube within said rotor having its end continuously immersed in the liquid above a certain speed of the rotor, a second tube shorter than the first having its end lipping the liquid at said certain speed of the rotor, a pressure gage, a reservoir of liquid, a connection between said first tube and said pressure gage, and a connection between said second tube and said reservoir of liquid, as set forth.

In testimony whereof I have signed my name to this specification.

GEORGE CONSTANTINESCO.